US009800296B2

(12) United States Patent
Aydin

(10) Patent No.: US 9,800,296 B2
(45) Date of Patent: Oct. 24, 2017

(54) METHOD FOR UPLINK TRANSMISSION OF DATA FROM A USER TERMINAL, A BASE STATION, A COORDINATION DEVICE, AND A COMMUNICATION NETWORK THEREFOR

(75) Inventor: Osman Aydin, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 1071 days.

(21) Appl. No.: 13/266,071

(22) PCT Filed: Apr. 15, 2010

(86) PCT No.: PCT/EP2010/054955
§ 371 (c)(1),
(2), (4) Date: Oct. 24, 2011

(87) PCT Pub. No.: WO2010/124938
PCT Pub. Date: Nov. 4, 2010

(65) Prior Publication Data
US 2012/0039208 A1    Feb. 16, 2012

(30) Foreign Application Priority Data

Apr. 27, 2009  (EP) ..................... 09305356

(51) Int. Cl.
*H04B 7/022*  (2017.01)
*H04B 7/026*  (2017.01)

(52) U.S. Cl.
CPC ............. *H04B 7/022* (2013.01); *H04B 7/026* (2013.01)

(58) Field of Classification Search
None
See application file for complete search history.

(56) References Cited

U.S. PATENT DOCUMENTS

| 2010/0103834 A1* | 4/2010 | Gorokhov et al. ........... 370/252 |
| 2012/0028665 A1* | 2/2012 | Kwon et al. ................. 455/501 |
| 2012/0147815 A1* | 6/2012 | Meyer et al. ................. 370/328 |

OTHER PUBLICATIONS

Parkvall s. et al., "LTE-Advanced—Evolving LTE towards IMT-Advanced," Vehicular Technology Conference, IEEE, XP031352496, pp. 1-5, Sep. 21, 2008.

(Continued)

*Primary Examiner* — Christine Duong
(74) *Attorney, Agent, or Firm* — Fay Sharpe, LLP

(57) ABSTRACT

The invention concerns a method for uplink transmission of data from a user terminal (UE), wherein the data are received by base stations (eNB1, eNB2, eNB3) on a wireless interface, at least one of the base stations (eNB2, eNB3) determines a quality of the received data on at least one processing level, the at least one of the base stations (eNB2, eNB3) determines a respective dedicated processing level of the data that will be used for sending the data to a coordinating device (eNB1) based on the at least one quality, the at least one of the base stations (eNB2, eNB3) sends the data to the coordinating device (eNB1) on the respective dedicated processing level, and the coordinating device (eNB1) determines decoded data by means of the data, a base station, a coordinating device, and a communication network therefor.

12 Claims, 3 Drawing Sheets

(56) References Cited

OTHER PUBLICATIONS

Figure 1:
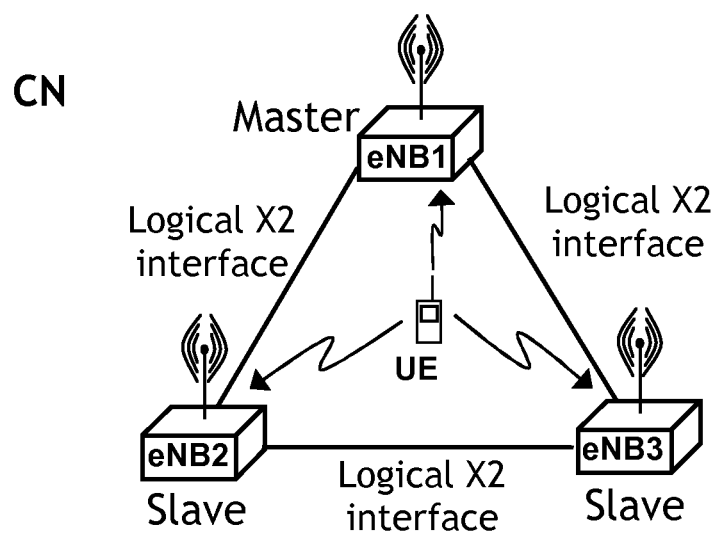

Ericsson, "LTE-Advanced—Coordinated Multipoint Transmission/Reception," $3^{rd}$ Generation Partnership Project (3GPP), TSG-RAN WG1 #53bis, R1-082469, Warsaw, Poland, XP050110740, pp. 1-6, Jun. 30-Jul. 4, 2008.
International Search Report for PCT/EP2010/054955 dated May 17, 2010.

* cited by examiner

METHOD FOR UPLINK TRANSMISSION OF DATA FROM A USER TERMINAL, A BASE STATION, A COORDINATION DEVICE, AND A COMMUNICATION NETWORK THEREFOR

BACKGROUND OF THE INVENTION

The invention relates to a method for uplink transmission, a base station, a coordinating device, and a communication network according to the claims.

Coordinated multipoint (CoMP) transmission and reception schemes are potential candidates for wireless communication standards, like e.g. LTE-Advanced (LTE=Long Term Evolution) or WiMAX (WiMAX=Worldwide Interoperability for Microwave Access), mainly to improve the coverage of high data rates and the cell-edge throughput, but also to improve the system throughput, as indicated e.g. in the Third Generation Partnership specification 3GPP TR36.814 V0.4.1(2009-02).

Coordinated multipoint transmission and reception is applied at least between two transmission and reception points respectively.

Coordinated multipoint reception makes use of the reception of an uplink signal that has been transmitted from a user terminal to several remotely located devices, as e.g. base stations which are serving cells.

In order to perform coordinated multipoint uplink, the base stations, as e.g. the enhanced NodeBs (eNBs) in LTE-Advanced, in the coordination area or group transfer the data which they received at their respective air interface to a coordinating device, e.g. to a master base station or to an external coordinated multipoint coordinating device, preferably via the so-called X2 interface, i.e. via the backhaul, for evaluation of the data from the different base station.

BRIEF SUMMARY OF THE INVENTION

The object of the invention is to propose a flexible resource-saving method for coordinated multipoint uplink.

This object is achieved by a method, a base station, a coordinating device, and a communication network according to the claims.

According to the invention, the data that is transferred from the base stations to the coordinating device can consist of data on different processing levels, as e.g. so-called transport blocks or code blocks, data on the so-called soft bit level, or data on the so-called IQ data level. This order of the processing levels reflects the order of the processing effort that is performed on the processing levels starting with the highest performed processing effort for transport blocks and ending with the lowest performed processing effort on the IQ data level. The more pre-processing is done by the base station that directly received the data from a user terminal, the less data has to be transferred to the coordinating device, and thus the less X2 interface backhaul is required. But on the other hand, the more pre-processed the data is, the less combination gain by combining data from different base stations can be achieved at the coordinating device.

According to the invention, the processing level of data which is used for reporting from a cooperating base station to a coordinating device is chosen dynamically depending on the quality, as e.g. the decoding success, on the different processing levels, i.e. on the Transport Block Level, Code Block Level, Soft Bit Level, or IQ Data Level. The base station chooses for reporting of the data to the coordinating device the processing level with the lowest amount of data to be transferred which still offers an acceptable quality, as e.g. an acceptable decoding success.

The coordinating device in turn uses the transferred data from the different base stations to determine decoded data e.g. by choosing decoded data transmitted from a base station that have an acceptable quality or by combining data from two or more base stations before decoding the data.

In summary, the main idea of the invention is a method for wireless uplink transmission of data from a user terminal, wherein the data are received by at least two base stations, at least one of said at least two base stations determines at least one quality of the received data on at least one processing level, the at least one of said at least two base stations determines a respective dedicated processing level of the data that will be used for sending the data to a coordinating device based on said at least one quality of the received data on at least one processing level, the at least one of said at least two base stations sends the data to the coordinating device on the respective dedicated processing level determined by said at least one of said at least two base stations, and the coordinating device determines decoded data by means of the data sent from the at least one of said at least two base stations.

Further developments of the invention can be gathered from the dependent claims and the following description.

BRIEF DESCRIPTION OF THE SEVERAL VIEWS OF THE DRAWING(S)

In the following the invention will be explained further making reference to the attached drawings.

FIG. 1 schematically shows a communication network comprising a master base station and two slave base stations for coordinated multipoint reception in which the invention can be implemented.

Figure 2:
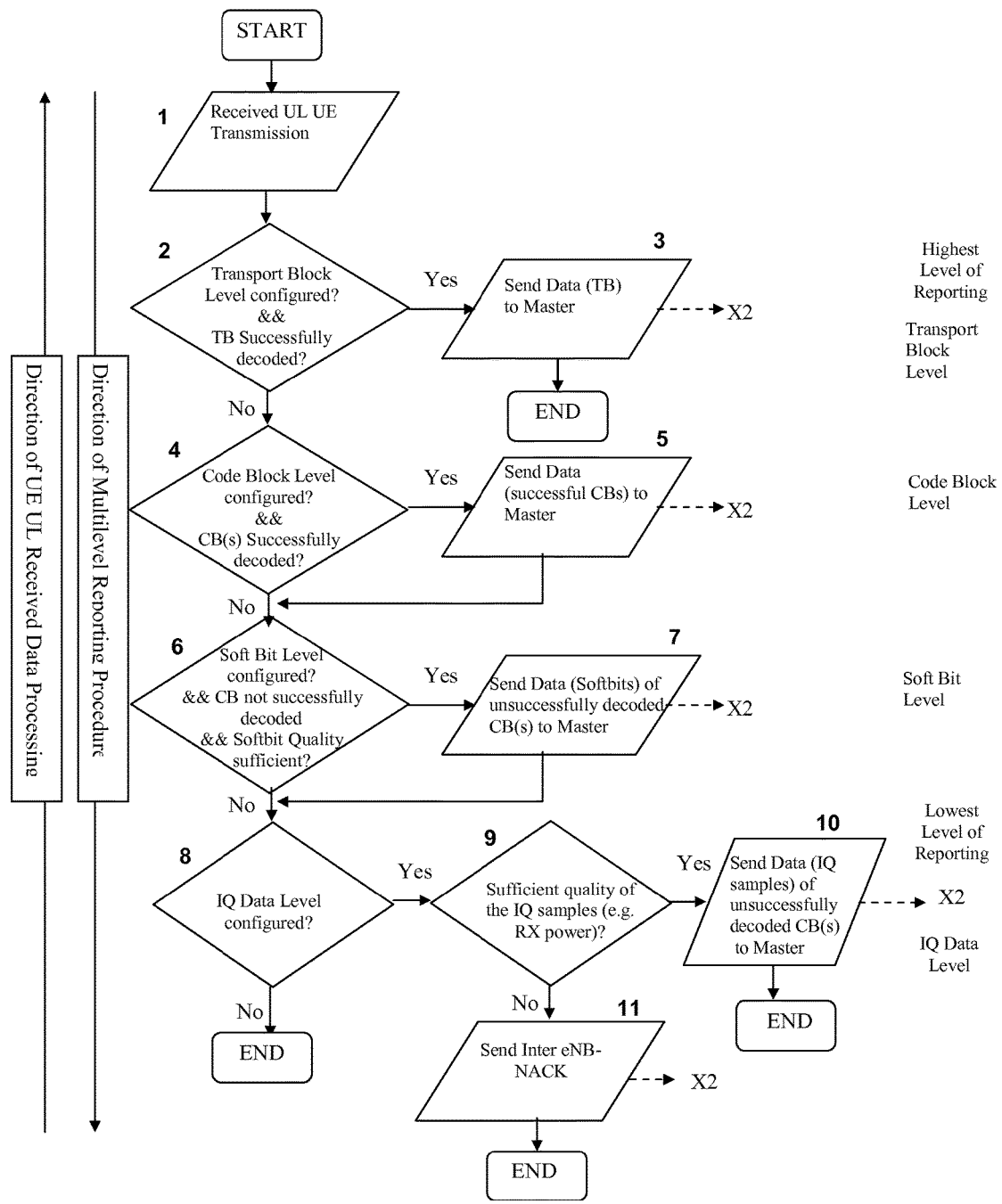

FIG. 2 schematically shows a flow chart for selecting the processing level of data which will be used for sending the data from a base station to a coordinating device according to the invention.

Figure 3:
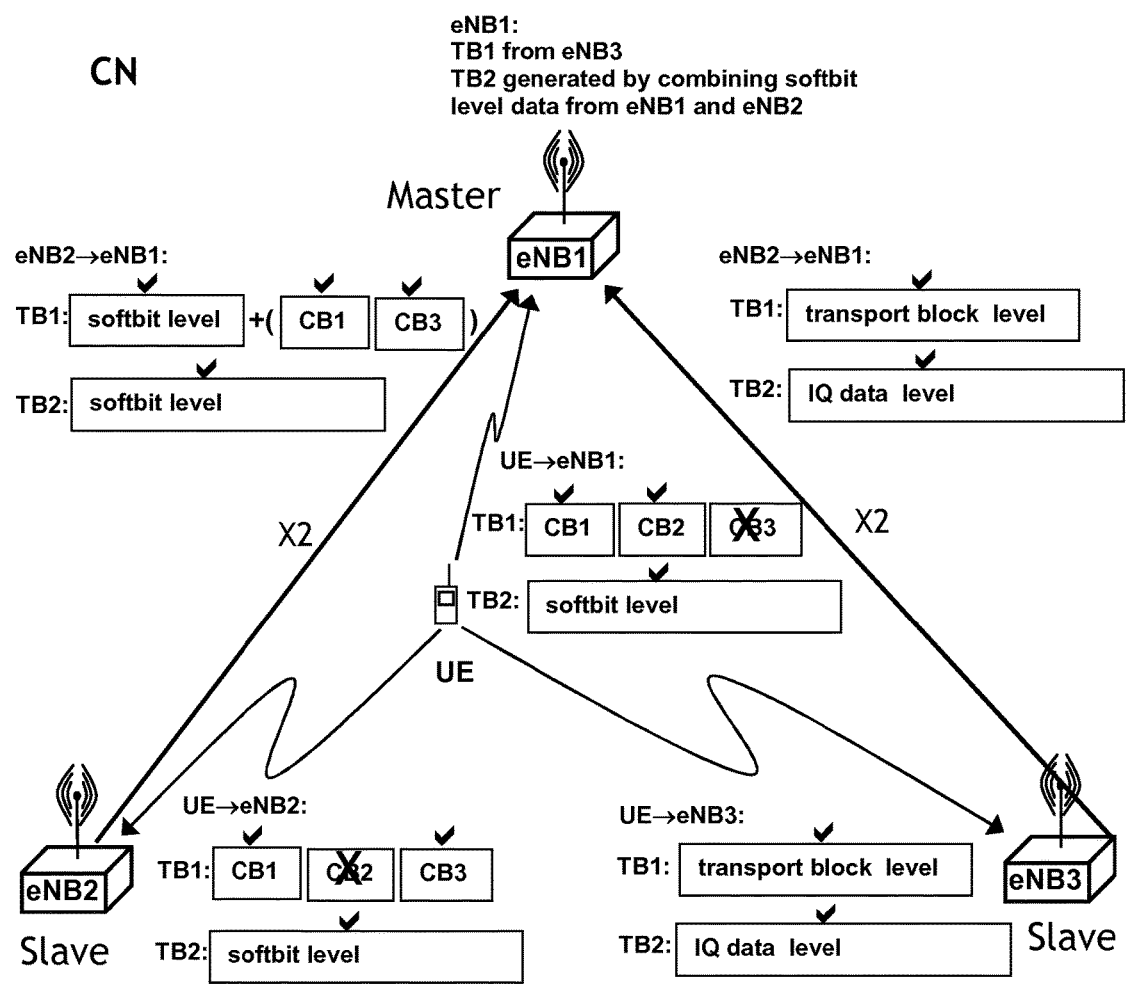

FIG. 3 schematically shows an example for data transmission on different processing levels from two base stations to a master base station for coordinated multipoint reception according to the invention.

DETAILED DESCRIPTION OF THE INVENTION

The principle structure of a communication network CN for coordinated multipoint reception in which the invention can be implemented is shown in FIG. 1. The communication network CN comprises a master base station eNB1, two slave base stations eNB2, eNB3 and a user terminal UE.

The master base station eNB1 and the two slave base stations eNB2, eNB3 are connected among each other by a logical so-called X2 interface which is indicated by solid lines in FIG. 1. However, it is of no importance for the invention which kind of connections are established between the base stations, and thus in alternative embodiments any kind of wireless or fixed backhaul connections between the base stations can be used to implement the invention.

The user terminal UE is connected to the master base station eNB1 and to the two slave base stations eNB2, eNB3 by means of a wireless connection, which is symbolized by arrows in FIG. 1.

The master base station eNB1 and the slave base stations eNB2, eNB3 are in turn directly or indirectly connected to a core network, which is not shown in FIG. 1 for the sake of simplicity.

In the following, the invention will be described for the application in LTE-Advanced, however, the invention can be applied in a similar way for other standards, as e.g. WiMAX.

The user terminal UE sends data to the master base station eNB1 and to the two slave base stations eNB2, eNB3 via a wireless connection. Only two slave base stations eNB2, eNB3 are used in the example depicted in FIG. 1, however, in further embodiments, an arbitrary number of slave base stations can be used for performing a method according to the invention.

The data which shall be transmitted from the user terminal UE are packed in transport blocks. For each uplink transport block, a cyclic redundancy check (CRC) of e.g. 24 bits for LTE is calculated and appended.

Each transport block is segmented in code blocks if the transport block exceeds a certain size of e.g. 6144 bits in case of LTE, and for each code block, also a cyclic redundancy check (CRC) is calculated and inserted in case of more than one code block in a transport block. Furthermore, the code block segmentation possibly includes filler bit insertion.

Then, the code block data are coded using e.g. Turbo coding with a rate of ⅓ in case of LTE.

Rate-matching and physical-layer hybrid automatic repeat request (HARQ) are performed in order to divide the bit stream delivered from the Turbo encoder into appropriate sets of bits for transmitting within a transmission time interval (TTI).

Afterwards, mobile-terminal specific bit-level scrambling is applied to the code bits with the aim to randomize the interference and thus to ensure that the processing gain provided by the channel code can be fully utilized.

For data modulation, the block of scrambled bits is transformed to a corresponding block of complex modulation symbols, as e.g. QPSK, 16QAM and 64 QAM, corresponding to two, four, and six bits per modulation symbol, respectively.

The base stations eNB1, eNB2 and eNB3 transform the data that have been sent from the user terminal UE as radio signals into the IQ data level e.g. with a resolution of 18 bits for the I value and the Q value respectively, i.e. 36 bits are used for representation of the modulation symbol on the IQ data level in this example.

The measured IQ data are mapped in the receiving base station eNB1, eNB2, eNB3 on soft bits which results in each bit of the modulation symbol being represented by a dedicated amount of soft bits. E.g. 6 soft bits can be used for representation of each bit of the modulation symbol, and if e.g. two bits per modulation symbol are used, as this is the case for QPSK as modulation scheme, then 12 bits are required for the soft bit representation of a modulation symbol on the soft bit level in this example, which is a considerable reduction compared to the 36 bits which are required on the IQ data level.

The soft bits are used to determine the hard bits of the code blocks by means of a FEC decoder (FEC=forward error correaction) and a cyclic redundancy check (CRC) in the receiving base station eNB1, eNB2, eNB3. The amount of bits used for representation of the data on the code block level is significantly reduced compared to the soft bit level by decoding the data and performing the cyclic redundancy check.

A further cyclic redundancy check is performed in the receiving base station eNB1, eNB2, eNB3 using the data on the code block level in order to determine the data on the transport block level. The amount of bits used for representation of the data on the transport block level is reduced compared to the code block level by performing the cyclic redundancy check.

The receiving base station eNB1, eNB2, eNB3 determines at least one quality of the received data on one or more of the processing levels IQ data level, soft bit level, code block level and transport block level.

On the IQ data level, the quality of the received data can be estimated e.g. by means of the received power or the signal to interference and noise ratio (SINR).

On the soft bit level, the quality of the received data can be estimated e.g. by means of the signal to interference and noise ratio (SINR) after combination and equalization of the I values and the Q values.

On the code block level and on the transport block level, the quality of the received data can be estimated e.g. by means of the result of the cyclic redundancy check (CRC), which can be either positive as an indication of a successful decoding or negative as an indication of an unsuccessful decoding.

The processing level of data which is used for reporting from the two slave base stations eNB2 and eNB3 to the master base station eNB1 is chosen dynamically depending on the quality, as e.g. the decoding success, on the different processing levels, i.e. on the transport block level, code block level, soft bit level, or IQ data level.

On the IQ data level, the quality of the received data can be declared as acceptable e.g. if the received power or the signal to interference and noise ratio (SINR) is higher than a predefined threshold above which it can be expected that the corresponding code block can be decoded, e.g. by combining IQ data from several base stations. Said predefined threshold can be determined by simulations or evaluation from measurements that have been performed in a communication network.

On the soft bit level, the quality of the received data can be declared as acceptable e.g. if the signal to interference and noise ratio (SINR) after combination and equalization of the I values and the Q values is higher than a predefined threshold above which code blocks that can be successfully decoded can be expected, e.g. by combining soft bits from several base stations. Said predefined threshold can be determined by simulations or evaluation from measurements that have been performed in a communication network.

On the code block level and on the transport block level, the quality of the received data can be declared as acceptable e.g. if the result of the respective cyclic redundancy check (CRC) is positive as an indication of a successful decoding.

In a preferred embodiment of the invention, the processing of the data in the two slave base stations eNB2 and eNB2 is stopped on a processing level, on which the data do not offer an acceptable quality, as the data are transferred to the master base station eNB1 on the processing level with the lowest amount of data to be transferred which still offers an acceptable quality, and thus, the processing of the data on the further processing levels is not required.

As already mentioned above, the load on the backhaul, i.e. on the X2 interfaces in FIG. 1, between the slave base stations eNB2 and eNB3 and the master base station eNB1 originated by coordinated multipoint reception can be reduced by multilevel reporting of received uplink data from the slave base stations eNB2 and eNB3 to the master base station eNB1. Reporting on transport block level has the lowest backhaul resource requirement, increasing if code block level, soft bit level and finally IQ data level, which has the highest backhaul resource requirement, is used for reporting. The slave base stations eNB2 and eNB3 choose for reporting of the data to master base station eNB1 the processing level with the lowest amount of data to be transferred which still offers an acceptable quality, as e.g. an acceptable decoding success.

In another embodiment, the processing level of data that will be used for sending the data to the coordinating device, i.e. to the master base station eNB1 in FIG. 1, can additionally be adapted dynamically depending on the backhaul bandwidth capacity, backhaul delay or backhaul load which is known e.g. from internal delay or load measurement performed in the base stations eNB1-eNB3 or from external information.

If a slave base station eNB2, eNB3 is processing the data and comes to the conclusion, that its own received data from the user terminal UE can be of no use for the master base station eNB1, the received data are not sent to the master base station eNB1, which can be indicated by just sending an inter base station Nack to the master base station eNB1, indicating that there is no useful data available. This omitting of sending data can spare valuable backhaul bandwidth capacity.

In the coordinating device, i.e. in the master base station eNB1 in FIG. 1, the data reported from the slave base stations eNB2 and eNB3 and the data received by the master base station eNB1 are used for determining decoded data. By combining the data received from all base stations eNB1-eNB3, the accuracy of the decoding process in the master base station eNB1 can be increased.

Data on the IQ data level from at least two base stations eNB1-eNB3 can e.g. be combined in the master base station eNB1 by adding the I values and the Q values and combining the resulting I values and Q values preferably using a weighting vector for decoding the data.

Data on the soft bit level from at least two base stations eNB1-eNB3 can e.g. be combined in the master base station eNB1 by calculation of the mean value based on a simple addition of the soft bits from the different base stations eNB1-eNB3.

Data on the code block or transport block level from at least two base stations eNB1-eNB3 can e.g. be combined in the master base station eNB1 by a compare process during which e.g. the most probable data for the code blocks or transport blocks are chosen, the code blocks or transport blocks are only accepted as correct if they are the same for all reporting slave base stations eNB2, eNB3, or a mean value is calculated for the code blocks or transport blocks based on the code blocks or transport blocks from the different base stations eNB1-eNB3.

If the master base station eNB1 has data from the different base stations eNB1-eNB3 on different processing levels for combining, the master base station eNB1 can either ignore the data on the lower processing levels, or combine the data on a higher processing level. E.g. if the master base station eNB1 has data on transport block level from a first slave base station eNB2 and on code block level from a second slave base station eNB3, the master base station eNB1 can ignore the data on code block level from the second slave base station eNB3, or if the master base station eNB1 has data on soft bit level from a first slave base station eNB2 and on IQ data level from a second slave base station eNB3, the master base station eNB1 can use the data on soft bit level from both slave base stations eNB2 and eNB3 for decoding the data.

In FIG. 2, a flow chart indicating a method according to the invention for selecting the processing level of data which will be used in a base station for sending the data from the base station to a coordinating device is shown.

The flow chart is organized in different processing levels for reporting data starting with the transport block level as the highest processing level at the top, followed by the code block level and the soft bit level and ending with the IQ data level at the bottom.

The order for the decision which of the different processing levels will be used for reporting is from the highest processing level at the top to the lowest processing level at the bottom of the flow chart, and the order of processing of the data is from the lowest processing level at the bottom to the highest processing level at the top.

In the first step 1, uplink data from a user terminal UE are received in the base station.

In the second step 2, it is checked whether the transport block level is set as a reporting level for reporting data to the coordinating device, and it is checked whether the transport block has been successfully decoded.

If the transport block level is set as a reporting level for reporting data to the coordinating device, and if the transport block has been successfully decoded, then in the third step 3, the data are sent on the transport block level over the backhaul to the coordinating device, and the procedure is stopped.

If the transport block level is not set as a reporting level for reporting data to the coordinating device, or if the transport block has not been successfully decoded, then it is checked in the fourth step 4 whether the code block level is set as a reporting level for reporting data to the coordinating device, and it is checked whether the code block or the code blocks have been successfully decoded.

If the code block level is set as a reporting level for reporting data to the coordinating device, then in the fifth step 5 the code blocks which have been successfully decoded are sent on the code block level over the backhaul to the coordinating device.

If the code block level is not set as a reporting level for reporting data to the coordinating device, or if at least one code block has not been successfully decoded, then it is checked in the sixth step 6 whether the soft bit level is set as a reporting level for reporting data to the coordinating device, and it is checked whether the quality of the soft bits of the at least one code block which has not been successfully decoded is acceptable.

If the soft bit level is set as a reporting level for reporting data to the coordinating device, then in the seventh step 7 the soft bits of the at least one code block which has not been successfully decoded which have an acceptable quality are sent on the soft bit level over the backhaul to the coordinating device.

If the soft bit level is not set as a reporting level for reporting data to the coordinating device, or if the quality of at least one soft bit is not acceptable, then it is checked in the eighth step 8 whether the IQ data level is set as a reporting level for reporting data to the coordinating device.

If the IQ data level is not set as a reporting level for reporting data to the coordinating device, then the procedure is stopped.

If the IQ data level is set as a reporting level for reporting data to the coordinating device, then in the ninth step 9 it is checked whether the quality of the IQ data is acceptable.

If the quality of the IQ data is acceptable then in the tenth step 10 the IQ data of the at least one code block which has not been successfully decoded are sent on the IQ data level over the backhaul to the coordinating device, and the procedure is stopped.

If the quality of the IQ data is not acceptable then in the eleventh step 11, an inter base station Nack is sent to the master base station, indicating that there is no useful data available, and the procedure is stopped.

In FIG. 3, an example for data transmission on different processing levels from two slave base stations eNB2 and eNB3 to a master base station eNB1 for coordinated multipoint reception according to the invention is shown.

A user terminal UE transmits data in uplink over an air interface, and the two slave base stations eNB2 and eNB3 and the master base station eNB1 respectively receive said data. Two transport blocks TB1 and TB2 of said uplink data are exemplarily depicted in FIG. 3.

In the first slave base station eNB2, the data received over the air interface in the first transport block TB1 could not be successfully decoded on transport block level. However, the first transport block TB1 consists of three code blocks CB1, CB2 and CB3, and the two code blocks CB1 and CB3 could be successfully decoded on the code block level. The data of the code block CB2 have an acceptable quality on the soft bit level.

In the first slave base station eNB2, the data received over the air interface in the second transport block TB2 could neither on transport level, nor on code block level be successfully decoded. However, the data of the second transport block TB2 have an acceptable quality on the soft bit level.

The data of the first transport block TB1 are transmitted from the first slave base station eNB2 to the master base station eNB1 over the X2 backhaul on the code block level for the successfully decoded code blocks CB1 and CB3, and on the soft bit level for the code block CB2, as the data of the code block CB2 have an acceptable quality on the soft bit level.

The data of the second transport block TB2 are transmitted from the first slave base station eNB2 to the master base station eNB1 over the X2 backhaul on the soft bit level, as the data of the second transport block TB2 have an acceptable quality on the soft bit level.

In the second slave base station eNB3, the data received over the air interface in the first transport block TB1 could be successfully decoded on transport block level.

In the second slave base station eNB3, the data received over the air interface in the second transport block TB2 could not be successfully decoded on transport block or code block level and have only an acceptable quality on the IQ data level.

The data of the first transport block TB1 are transmitted from the second slave base station eNB3 to the master base station eNB1 over the X2 backhaul on the transport block level, as the data of the first transport block TB1 could be successfully decoded on transport block level.

The data of the second transport block TB2 are transmitted from the second slave base station eNB3 to the master base station eNB1 over the X2 backhaul on the IQ data level, as the data of the second transport block TB2 only have an acceptable quality on the IQ data level.

In the master base station eNB1, the data received over the air interface in the transport block TB1 could not be successfully decoded on transport block level. However, the transport block TB1 consists of three code blocks CB1, CB2 and CB3, and the two code blocks CB1 and CB2 could be successfully decoded on the code block level. The data of the code block CB3 has on no processing level an acceptable quality.

The master base station eNB1 uses for decoding the data in the first transport block TB1 the data transmitted from the second slave base station eNB3, as the first transport block TB1 has been successfully decoded in the second slave base station eNB3.

The master base station eNB1 uses for decoding of the data in the second transport block TB2 a combination of the data on the soft bit level from the master base station eNB1 and the first slave base station eNB2, as the soft bit level is the highest processing level with an acceptable quality for the data in the second transport block TB2. In another embodiment, the IQ data from the second slave base station eNB3 can be transformed into soft bits in the master base station, and said soft bits can additionally be used for decoding of the data in the second transport block TB2.

In an embodiment of the invention, the base stations, like e.g. the slave base stations eNB2 and eNB3, send the received data from all user terminals to the coordinating device, like e.g. the master base station eNB1. The coordinating device then either decodes the data using coordinated multipoint reception from all user terminals, or only decodes the data using coordinated multipoint reception from user terminals that are known to the coordinating device as participating in coordinated multipoint reception.

In another embodiment of the invention, it is predefined and known to the base stations, that coordinated multipoint reception is only performed for user terminals that use modulation and coding schemes (MCS) with a predefined minimum requirement for the robustness, i.e. the base stations only send data from user terminals with a minimum robustness of the modulation and coding scheme to the coordinating device. E.g., coordinated multipoint reception is only performed for user terminals with a modulation scheme of 4-QAM or lower and a coding scheme with a code rate of 0.5 or lower, and only for such user terminals, data are sent from the base stations to the coordinating device.

In a further embodiment of the invention, the coordinating device, i.e. the master base station eNB1 in the above-described embodiments, sends scheduling information preferably over the backhaul to the two slave base stations eNB2 and eNB3 indicating the radio resources, as e.g. the time-frequency resources, of the user terminals which participate in coordinated multipoint reception, as e.g. the user terminal UE in the above-described embodiments. By means of said scheduling information, the slave base stations eNB2 and eNB3 know which data on which radio resources belong to user terminals that participate in coordinated multipoint reception and thus must be transmitted over the backhaul to the coordinating device.

In a yet further embodiment of the invention, the base stations remove signals from user terminals that do not participate in coordinated multipoint reception from the overall IQ data, which leads to interference-reduced IQ data for user terminals participating in coordinated multipoint reception that will be sent to the coordinating device. For removing the interference, a so-called successive interference canceller (SIC) can be used, and the user terminals participating in coordinated multipoint reception are known to the base stations from scheduling information e.g. sent from the coordinating device.

The invention claimed is:
1. A method for handling uplink transmission data received from a user terminal, comprising:

receiving the data by at least two base stations on a wireless interface, determining, by at least one of said at least two base stations, at least one quality of the received data on at least one processing level, determining, by the at least one of said at least two base stations, a respective dedicated processing level of the data that will be used for sending the data to a coordinating device based on said at least one quality of the received data on the at least one processing level, sending, by the at least one of said at least two base stations, the data to the coordinating device on the respective dedicated processing level determined by said at least one of said at least two base stations, and determining, by the coordinating device, decoded data using the data sent from the at least one of said at least two base stations;

wherein said at least one of said at least two base stations sends the data to the coordinating device when said at least one quality of the received data on the at least one processing level is higher than a predefined threshold above which it is known that the data can be successfully decoded.

2. The method according to claim 1, wherein the coordinating device combines data from at least two base stations before determination of the decoded data.

3. The method according to claim 1, wherein said coordinating device is a dedicated base station.

4. The method according to claim 1, wherein said at least one processing level is at least one of transport block level, code block level, soft bit level, and IQ data level in which signal data is represented by real (I) and imaginary (Q) values.

5. The method according to claim 1, wherein the at least one of said at least two base stations determines the respective dedicated processing level of the data that will be used for sending the data to the coordinating device depending on at least one of backhaul bandwidth capacity, backhaul delay and backhaul load.

6. The method according to claim 1, wherein said at least one of said at least two base stations sends a NACK message to the coordinating device if said at least one quality of the received data is not higher than a predefined value on at least one processing level.

7. The method according to claim 1, wherein the coordinating device sends scheduling information to said at least one of said at least two base stations indicating on which radio resources the data are sent from the user terminal to the at least one of said at least two base stations.

8. The method according to claim 4, wherein said at least one of said at least two base stations removes signals received from other user terminals from overall signals on the IQ data level in order to determine the data that will be sent from the at least one of said at least two base stations to the coordinating device.

9. A base station for wireless communication wherein the base station comprises:
at least one processor configured to:
receive data which were sent from a user terminal,
determine at least one quality of the received data on at least one processing level,
determine a respective dedicated processing level of the data that will be used for sending the data to a coordinating device based on said at least one quality of the received data on at least one processing level,
and send the data to the coordinating device on the determined respective dedicated processing level when said at least one quality of the received data on the at least one processing level is higher than a predefined threshold above which it is known that the data can be successfully decoded.

10. A coordinating device for wireless communication wherein the coordinating device comprises:
at least one processor configured to:
receive uplink data of a user terminal via at least two base stations,
and determine decoded data via the received uplink data sent from the at least two base stations;
wherein the received uplink data is received on a processing level with a lowest amount of data to be transferred, and which has a quality above a predetermined threshold, relative to a plurality of other processing levels, wherein said predetermined threshold is a threshold above which it is known that the data can be successfully decoded and is determined from measurements made within a communication network in which the coordinating device is deployed.

11. The coordinating device according to claim 10, wherein the coordinating device is a dedicated base station.

12. A communication network for wireless communication, comprising:
base stations according to claim 9; and
a coordinating device for wireless communication, the coordinating device comprising:
at least one processor configured to:
receive uplink data of a user terminal via at least two base stations, and
determine decoded data using the received uplink data sent from the at least two base stations.

* * * * *